UNITED STATES PATENT OFFICE.

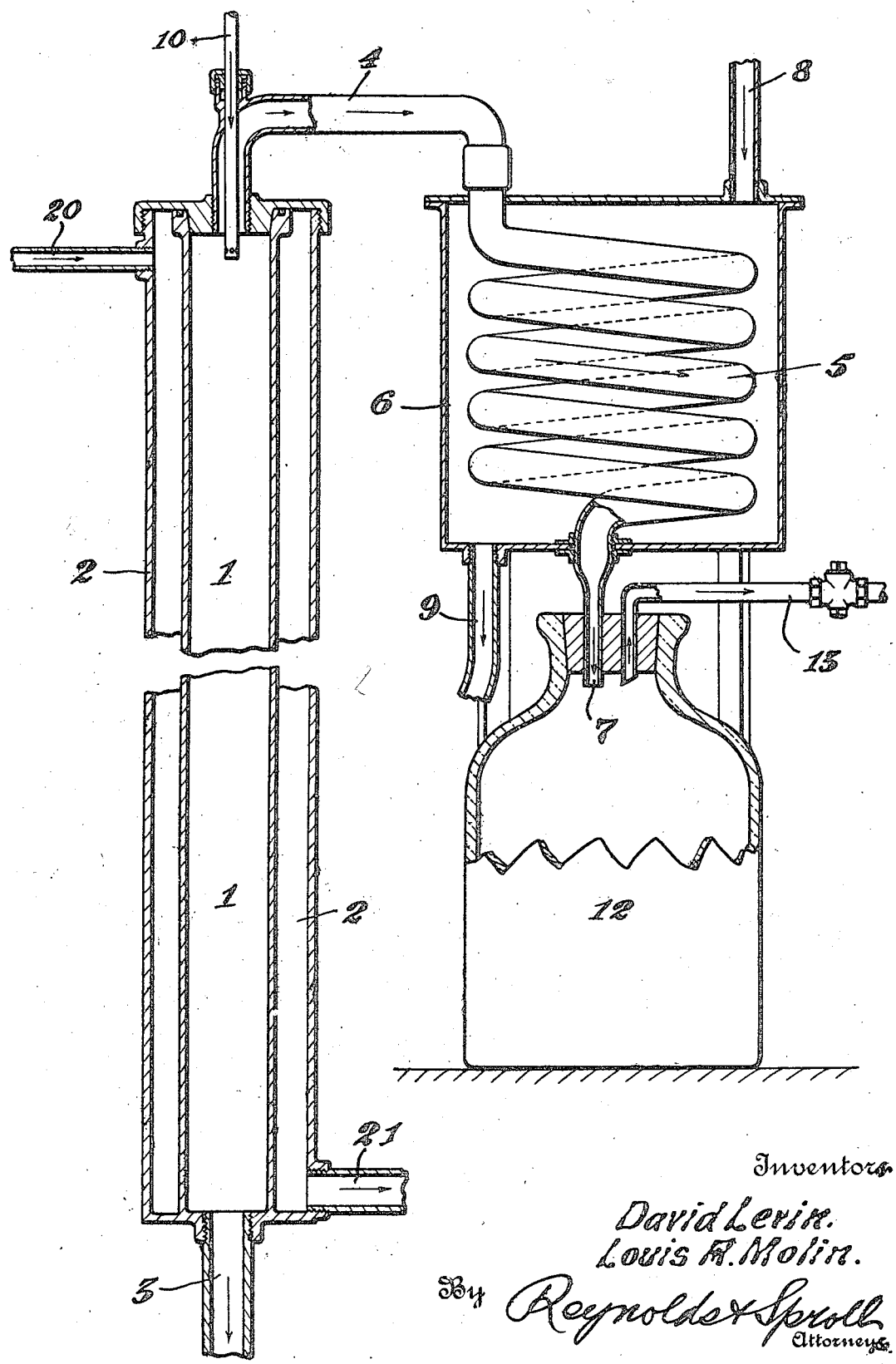

DAVID LEVIN AND LOUIS A. MOLIN, OF BUFFALO, NEW YORK, ASSIGNORS TO COMMERCIAL ELECTROLYTIC CORPORATION, OF NEW YORK, N. Y., A CORPORATION OF NEW YORK.

PROCESS OF MAKING HYDROGEN PEROXID.

1,323,075. Specification of Letters Patent. Patented Nov. 25, 1919.

Application filed April 5, 1916, Serial No. 88,984. Renewed May 2, 1919. Serial No. 294,348.

*To all whom it may concern:*

Be it known that we, DAVID LEVIN and LOUIS A. MOLIN, citizens of the United States, and residents of Buffalo, county of Erie, State of New York, have invented certain new and useful Improvements in Processes of Making Hydrogen Peroxid, of which the following is a specification.

Our invention relates to a process of production of hydrogen peroxid.

The object of our invention is to make the film distillation method one which may be operated upon a commercial scale by means which will reduce the cost of the necessary apparatus, increase the capacity of the plant, decrease the cost of maintenance, and make of film distillation a practical working process. The manner in which we propose to do this and the means to be employed, will be hereinafter set forth and an apparatus suited to securing these results will be illustrated in the accompanying drawings.

The figure of drawings shows an elevation of an apparatus which may be used in carrying out our invention, this figure being mainly in section.

The drawing shows in a diagrammatic manner a form of apparatus which is suited to our purpose, and with which the principles of our process may be carried out, it however being understood that the tubes illustrated herein can take any form. The feature of our invention resides in the metal surfacing of the inner chamber of an apparatus.

In the patent to Leo Lowenstein, No. 1,013,791, issued January 2, 1912, is described a process of procuring hydrogen peroxid by passing persulfuric acid, or its products of transformation as a thin film over a heated area. The heating of persulfuric acid or its transformation products under proper conditions, causes the release of fumes of peroxid of hydrogen ($H_2O_2$) which fumes are then conducted away and condensed.

In the practical work of carrying out this process it has been deemed necessary to employ tubes of glass, earthenware or like acid proof material, the use of ordinary metal tubes having been deemed impractical because of supposed rapid deterioration.

When vitreous materials are used as the means for transferring heat to the persulfuric liquid, the rate of heat transfer is very low, due to their low rate of heat conductivity. In consequence of this it is necessary to maintain a slow rate of flow of the persulfuric liquid, and to make the tube longer to get an equal distillation effect.

Now then we have found from considerable research, experimentation and manufacture on commercial basis, that although contact with heated metallic surfaces rapidly destroys persulfate solution and $H_2O_2$, however this decomposition takes place within a definite time; and in many cases complete decomposition does not take place before fifteen to thirty minutes. In view of the above facts, we have found that by regulating the rapidity of distillation to be greater than the rapidity of decomposition, we are able to obtain a high efficiency in yield of $H_2O_2$, and in rapid commercial quantities with the use of certain metallic stills, as hereinafter described.

In carrying out our process we herein illustrate a well known form of apparatus well adapted for the purpose comprising metal tubes, preferably of lead, because of their moderate cost and the ability to readily get them in suitable sizes and shapes. We have however used gold and platinum with success, but on account of the cost of these metals we prefer, for commercial work to use lead. Such tubes may be installed as shown in the drawings, 1 representing a vertically positioned lead tube, within which the distillation takes place, and 2 a surrounding tube of iron between which tubes, steam or other heating agent is introduced to furnish the distilling temperatures. The steam may be admitted at 20 and condensed water drawn off through tube 21. A container 12 receives the peroxid, and this is provided with an exhausting connection 13 to an air exhausting pump.

The persulfuric liquid, by which term we mean to include persulfuric acid and solutions of persulfates, is introduced at the top of tube 1, as through pipe 10, in such manner as to produce a film over the entire inner surface of the pipe 1. This may be secured by introducing the liquid as a jet or jets, in a direction to cause it to strike upon and cover the walls of the tube, as through holes in the side of tube 10.

The peroxid of hydrogen fumes distilled off pass upward, through a connecting pipe 4 to a condenser formed of a coil 5 within a tank 6, which tank is supplied with water through pipe 8. The peroxid is discharged at 7. This arrangement of condenser is only given as a construction typical of what is required. The sulfate liquor, from which the peroxid has been distilled is discharged through pipe 3.

In the operation of such an apparatus, the walls of tube 1 being thin and of a metal having a satisfactorily high rate of heat conductivity, the film may be quickly heated to an efficient distilling temperature, which means that distillation is sufficiently rapid that the fumes are discharged and cooled in the condenser 5, before time has elapsed for the heat to produce dissociation therein. In consequence a high percentage of production is secured.

Furthermore, the liquid film maintained on the inner surface of the tube 1 protects it from the action of the peroxid fumes, and its integrity is thereby maintained. Further by being able to distil faster than the rate at which dissociation takes place, we are able to use metal tubes even if not at all times protected by the liquid film. This we deem a matter of considerable importance, as by reason of these facts we are enabled to use metallic tubes and to secure a satisfactory life therefor.

We are thus able to make the process satisfactory and practical on a commercial scale, which it could not be if limited to the use of glass or stoneware tubes. Prior to our discovery of the possibility of using metal tubes, and the manner in which this may be done, their use has been thought impossible, because of the chemical action occurring between the tube material and the peroxid fumes. We have, however, discovered that such action will not take place if the peroxid fumes are promptly removed and condensed. The peroxid should be cooled as promptly as possible after generation, thus giving no time for any material dissociation to take place.

By following these principles we are able to secure a much higher yield of hydrogen peroxid, and to produce it at a very largely increased rate and with an apparatus of low first cost, having a low deterioration. We have thus made a valuable commercial process based upon a process which was commercially impractical.

One feature which contributes materially to the success of our process, is that by the use of metal tubes with their high rate of heat conductivity, we are able to distil off the peroxid at a rate faster than the dissociation can take place, thereby saving most of the losses which are chargeable to this action.

What we claim as our invention is:

1. The process of securing hydrogen peroxid from solutions of persulfates by film distillation, which consists in distilling the solution over heated sulfuric-acid-proof metallic surfaces, and in maintaining a rapid rate of flow of the solution to be distilled.

2. The process of securing hydrogen peroxid from solutions of persulfates by film distillation, which consists in spraying the liquid to be distilled over heated sulfuric-acid-proof metallic surfaces and maintaining an unbroken protective film over the metallic surfaces by the rapid rate of flow of the liquid to be distilled.

3. The process of securing hydrogen peroxid from solutions of persulfates, which consists in rapidly passing a persulfate solution over a heated sulfuric-acid-proof metallic surface, maintaining an unbroken protective film over the metallic surface, and in removing the hydrogen peroxid fumes given off at a rate high enough to prevent dissociation occurring.

4. The process of securing hydrogen peroxid from solutions of persulfates, which consists in rapidly passing a persulfate solution over a heated sulfuric-acid-proof metallic surface, maintaining an unbroken protective film over said heated metallic surface by said liquid, and in removing and condensing the hydrogen peroxid fumes given off from the distilling chamber at a rate high enough to prevent dissociation occurring.

5. The process of securing hydrogen peroxid from solutions of persulfates, which consists in rapidly passing a persulfate solution over a heated sulfuric-acid-proof metallic surface, maintaining an unbroken protective film over said heated metallic surface by said liquid between the liberated hydrogen peroxid fumes and said metallic surface and in removing the liberated peroxid fumes from the distilling chamber into a condenser at a rate to permit their cooling in said condenser before dissociation occurring in said distilling chamber.

6. The process of producing hydrogen peroxid from solutions of persulfates, which consists in flowing the solution continuously in the form of an unbroken film over a heated sulfuric-acid-proof metallic surface in a distilling chamber to create fumes of hydrogen peroxid, continuously removing said fumes from the chamber at a rate to prevent dissociation thereof in the presence of the metallic surface, and condensing the removed fumes.

7. The process of producing hydrogen peroxid, which consists in flowing a solution, capable of liberating hydrogen peroxid when heated, over a heated acid-proof metallic surface, whereby fumes of hydrogen peroxid will be liberated, removing said fumes from the distilling chamber at a rate high enough to prevent dissociation thereof in the presence of the metallic surface and condensing the removed fumes.

Signed at Seattle, Washington, this 29th day of March, 1916.

DAVID LEVIN.
LOUIS A. MOLIN.